3,053,810
PROCESS FOR THE PRODUCTION OF
LINEAR COPOLYESTERS
Wolfgang Griehl and Hans Lueckert, Chur, Switzerland, assignors to Inventa A.G. fur Forschung und Patentverwertung, Zurich, Switzerland
No Drawing. Filed May 6, 1960, Ser. No. 27,296
Claims priority, application Switzerland May 9, 1959
4 Claims. (Cl. 260—77.5)

The invention relates to a process of manufacturing linear copolyesters and, more particularly, of polyesters obtained by the condensation of carbonates of ω-oxyalkyl-esters of aromatic oxycarboxyl acids.

Polyester resins such as polyethylene terephthalate possess valuable properties due to their regular configuration. Such properties are high melting points and easy fabrication into fibers, filaments, films, foils, etc.

However, it often is desirable for further fabrication that the polyesters have modified properties. For instance, those polyesters, which are to be fabricated into foils, preferably should have a wider softening range and comparatively little tendency to crystallize. Furthermore, it often is advantageous that the polyesters are not only soluble in such media as concentrated sulfuric acid and phenols, but in the more commonly employed organic solvents, especially when they are to be spun from solutions. When the polyesters are to be fabricated into filaments, lack of dyeability is a drawback, as is the lack of elasticity when the filaments are to be stretched more than 5 percent.

It now has been found that extremely valuable thermoplastics of wide applicability can be obtained by co-condensation of carbonates of ω-oxyalkyl esters of aromatic oxycarboxylic acids having the generic Formula 1:

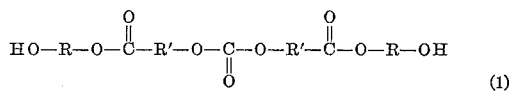

(1)

wherein R are alkylene radicals and R' are arylene radicals, with bis-ω-oxyalkyl esters of dicarboxylic acids of the generic Formula 2:

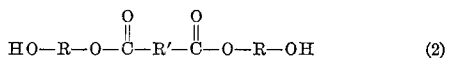

(2)

wherein R is an alkylene radical having 2 to 8 carbon atoms and R' is an arylene or alkylene radical having 2–10 carbon atoms.

For instance, copolyesters containing 5–10 percent oxycarboxylic acid in the acid component exhibit considerably better dyeability than the corresponding pure polyesters, e.g., polyethylene terephthalate. Also, the copolyesters according to the invention possess improved elasticity over the pure polyesters so that better stability of form and shape of the textile goods made therefrom is attained. The melting point of the copolyesters according to the instant invention, at the same time, is sufficiently high to insure the manufacture of wearing apparel and other finished goods which readily lend themselves to ironing. The melting point of a copolyester of terephthalic acid and 10 mol percent vanillic acid in the acid component, for instance, is 240° C.

On the other hand, these copolyesters whose portion of molar oxycarboxylic acid is, e.g., less than 70 to 80 percent, are eminently suited as thermoplastic resins due to their low tendency toward crystallization and also due to their wide softening range. These compounds can opportunely be fabricated into films, foils, rods, pipes, and similar structures.

As is well known, the molecular weight of molten polyethylene terephthalate decreases at 280° C. within 12 hours to approximately one-half of its original value. This so-called thermal degradation occurs immediately after termination of the polycondensation and is the higher, the higher the molecular weight attained has been. This phenomenon, of course, already begins to occur during the polycondensation, and it is for that reason that comparatively long periods of time are required for condensation. Another consequence is the necessity to empty the polycondensation vessel in as short a time as possible so that differences in molecular weight of the product obtained are averted. Most important, however, is the fact that it is not feasible in practice to fabricate the product obtained directly from the condensation vessel into fibers and the like because great differences would occur in the physical strength characteristics at the beginning and the end of the spinning process.

In contradistinction, the copolyesters according to the invention exhibit remarkable thermal stability. As low a content as 8 mol percent oxybenzoic acid or vanillic acid as the acid component of a copolyester, otherwise consisting of ethylene glycol and terephthalic acid, has the effect that at 270° C. within 12 hours a degradation of no more than 10 percent of the original molecular weight takes place. As a consequence of this favorable behavior of these copolyesters, a shortening of the condensation time by approximately 30 percent is feasible and, most important of all, the fabrication into fibers, foils, ribbons and the like can be accomplished directly from the melt. Hence, the copolyesters can readily be manufactured and fabricated in a semicontinuous process. The somewhat lowered melting point of the copolyesters according to the invention exerts a favorable influence thereby. This is because these polyesters to be directly fabricated from the melt can be kept at 250–360° C., at which temperature range substantially no thermal degradation occurs, in contrast to polyethylene terephthalate, which must be held at 270–280° C. and which suffers from thermal degradation, as set forth above.

The properties of the easily dyeable copolyesters according to the invention, e.g., softening range, elasticity, solubility, etc., can be varied within a wide range by the proper choice of the components and of their proportions. As glycols those can be used, for instance, which we have named in our co-pending application, Serial Number 797,-589, filed March 6, 1959, for a process of manufacturing linear copolyesters of carbonic acid, or also other aliphatic or cycloaliphatic dioxy compounds. The following dioxy compounds are named as examples of usable products, but should not be regarded as limitation thereto:

Ethylene glycol; propane diol-1,3; propanediol-1,2; butanediol-1,4; butanediol-1,3; 2-methyl propanediol-1,3; pentanediol-1,5; hexanediol-1,6; octanediol-1,8; cyclohexanediol-1,6; p-xylylenediol; hydroquinone-bis-(-β-oxyethyl ether); and others.

Applicable acid components, aside from aliphatic dicarboxylic acids of the generic Formula 3:

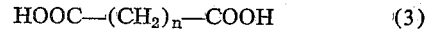 (3)

wherein $n$ can equal 2–10 especially are aromatic dicarboxylic acids, such as terephthalic acid, isophthalic acid, naphthalene dicarboxylic acids, p,p'-diphenyl dicarboxylic acids, and dicarboxylic acids of the generic Formula 4:

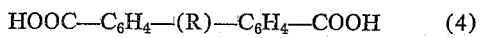 (4)

wherein R may be O; $(CH_2)_n$; O—$(CH_2)_n$—O; or —$SO_2$—. $n$ in these cases may be 1–5.

In order to carry out the process according to the invention, ω- oxyalkyl esters of 4,4'-carboxy-bis-phenyl carbonates and aliphatic or aromatic dicarboxylic acids are poly-condensed in the desired proportions in the presence of an alkali or alkaline earth metal, or of a compound of these metals which is soluble in the reaction mixture, or of any other suitable catalyst promoting ester interchanges. The catalyst should be present in amounts of 0.003 to 0.3 percent by weight, calculated on the substances employed.

Aside from those mentioned in the preceding paragraph, the following metals can be employed as condensation catalysts in the form of powders, shavings, wires, as oxides or as compounds soluble in the reaction mixtures, such as carbonates, acetates, alcoholates, borates, and others: Al, Zn, Pb, Sn, Bi, Co, Sb, Ge, U, Ti, Zr, La, Cd, Fe, Mn.

Especially advantageous is the use of the following compounds as catalysts: $Ti(OR)_4$; $[M_2Ti(OR)_6]$;

$M[HTi(OR)_6]$; $Me[Ti(OR)_6]$; $Me[HTi(OR)_6]_2$ $M[Al(OR)_4]$; $TiX_4$ and ether complexes of $TiX_4$;

$M[Zr(OR)_6]$; $M[HZr(OR)_6]$; $Me[Zr(OR)_6]$ $Me[HZr(OR)_6]$; or $PbR_4$; wherein M is an alkali metal, Me an alkaline earth metal and R an alkyl group having 1–6 carbon atoms.

The ω-oxyalkyl esters of the dicarboxylic acids can be produced in any conventional manner, for instance by heating the dicarboxylic acid with an excess of a glycol, reacting the acid halides of the dicarboxylic acids with the desired diols or else by reaction of the dicarboxylic acid salts with an alkylene oxide.

Preferably, however, the ω-oxyalkyl esters of aliphatic or aromatic dicarboxylic acids are prepared by an ester interchange of their respective methyl-, ethyl-, propyl, isopropyl-, n-butyl-, secondary butyl- or amyl esters in the presence of a suitable catalyst which promotes ester interchanges. Suitable catalysts, e.g., are alkali and alkaline earth metals, Mn, Co, Ti, Pb, Al, Zn, Cd, Sn, Zr, La or soluble compounds of these metals, such as alcoholates, glycolates, acetates, formates, etc. The methyl-, ethyl- or amyl esters of 4,4′-carboxy-bis-phenyl carbonates are obtained in excellent yields by reaction of the aromatic oxyacids or their corresponding esters with phosgene in an alkaline medium.

A preferred embodiment of the invention consists in heating the alkyl esters of 4,4′-carboxy-bis-phenyl carbonates in the desired proportions with alkyl esters of aromatic or aliphatic dibasic acids with a glycol in the presence of a suitable ester interchange catalyst for such a time at which the calculated amount of the corresponding alcohol has distilled over. The reaction product thus obtained then is polycondensed in a suitable vessel in an inert atmosphere and at elevated temperatures, if necessary or desired, with the addition of a special catalyst which promotes polycondensation.

The temperatures required for the polycondensation differ with the different ingredients to be condensed. In general, the reaction mixture, in an inert atmosphere, i.e., under hydrogen or nitrogen cover, should gradually be heated with strong agitation to 240–280–300° C., whereby the pressure should carefully be reduced to approximately 15 mm. As soon as most of the glycol being split off has distilled over, the vacuum is lowered to 3–0.05 mm and heating continued until the viscosity desired for further fabrication of the copolyester thus formed has been attained. In order to accelerate the polycondensation further, inert gases, like $N_2$, $H_2$ or inert hydrocarbons in gaseous form can be introduced into the viscous masses during the reaction, with or without a simultaneous vacuum.

For the production of exceptionally clear and colorless condensates, the addition of phosphorus compounds before or during the reaction is recommended. Suitable materials are orthophosphoric acid, pyrophosphoric acid, or triphenyl phosphate, in amounts of 0.05 to 2 percent by weight.

The molecular weight of the copolyesters can be predetermined exactly by the addition of monofunctional compounds acting as chain stoppers, especially of acid anhydrides, e.g., p-toluylic acid anhydride. Addition of the molecular weight stabilizer can be carried out before or during the polycondensation reaction. However, it is preferred to add the amount of the chain stopper calculated for attainment of a definite molecular weight at an advanced stage of the polyesterification. The copolyesters obtained are thermoplastic and can be fabricated in a conventional manner into shaped structures, such as fibers, films, foils or bristles. Due to the comparatively good solubility in organic solvents, the fabrication of the copolyesters from solutions particularly is facilitated.

Furthermore, it is feasible to produce the copolyesters according to the invention by condensation in an inert, high-boiling solvent which dissolves the monomers as well as the polymers. Particularly good condensation media are, e.g., 1-methyl naphthalene, tetrahydronaphthalene, decahydronaphthalene, diphenyl oxide, diphenyl and benzophenone.

According to a further embodiment, the principal components of the copolyesters are converted separately into a high-molecular state, then are combined, and the polycondensation is continued. The mixture forms the copolyester desired after 15–30 minutes reaction time under the conditions required for polycondensation.

The process according to the invention now will be further illustrated by the following examples. However, it should be understood that these are given merely by way of explanation, not of limitation, and that numerous changes and modifications may be made in the details without departing from the spirit and the scope of the invention as hereinafter claimed.

*Example 1*

A mixture of 55 parts by weight bis-β-oxyethyl ester of 4,4′-carboxy-bis-phenyl carbonate, 2.5 parts by weight bis-β-oxyethyl-isophthalate and 0.02 part by weight and 0.02 part by weight $[MgTi(OC_4H_9)]_6$, dissolved in 10 parts by volume butanol, is heated to 27–290° C. in a nitrogen atmosphere at a pressure of 50–10 mm., and the main portion of the glycol, split off thereby, distilled. The pressure then is lowered to 0.3–1 m., and the mixture is stirred for 2–4 more hours at the same temperature. The highly viscous melt formed is a colorless and high-molecular polyester which is particularly suited for the fabrication into films and for extrusion and injection molding. A 0.5 percent solution of the condensate in equal amounts of phenol and tetrachloroethane has a relative viscosity of 1.32. The product has a softening point of 120–130° C.

*Example 2*

70 parts by weight dimethylester of 4,4′-carboxy-bis-phenyl carbonate, 14 parts by weight terephthalic acid dimethyl ester and 55 parts by volume ethylene glycol are heated in a round-bottom flask equipped with a short column in the presence of 0.1 part by weight calcium acetate to 180–240° C. After the calculated amount of methanol, according to theory, has distilled over, the reaction mixture is transferred to a condensation vessel provided with agitator, gas inlet and evacuation means. 0.08 part by weight antimony acetate are added to the mixture, and the latter heated slowly to 280–300° C. while simultaneously conducting a weak stream of an inert gas through the entirely colorless melt. Vacuum is applied and gradually and carefully increased with progressing condensation until a pressure of 0.03 to 1 mm. has been attained. Strong agitation of the viscous melt is recommended in order to facilitate the evaporation of the glycols split off. Heating is continued until the viscosity required for spinning or shaping has been reached. That usually takes approximately 4 hours. A colorless thermoplastic resin is obtained having a relative viscosity of 1.36 in a 0.5 percent solution in phenol and tetrachloroethane (1:1). The condensate can be fabricated from the melt or from solution and has a softening point of 155–160° C.

*Example 3*

80.5 parts by weight dimethyl ester of 4,4'-carboxy-2,2'-dimethyl-bis-phenyl carbonate are heated to 180–240° C. together with 60 parts by weight ethylene glycol in the presence of 0.1 part by weight lithium methylate. After 3 to 5 hours, the theoretical quantity methanol has distilled over, and the ester interchange is completed. The excess ethylene glycol then is removed completely by distillation, and heating is continued for 80–90 minutes at a pressure of 50 to 12 mm. The precondensate thus obtained, having an approximate molecular weight of 9,000 now is mixed with a precondensate consisting of 150 parts by weight diethyl ester of 4,4'-diphenyldicarboxylic acid, 80 parts by weight propane-diol-1,3 and 0.2 part by weight cobalt acetate, obtained in the same manner as the first-named precondensate.

Mixing of the two precondensates is carried out in a condensation vessel equipped with agitator, gas inlet and vacuum means at 280–295° C. for 4–6 hours and with an increasing vacuum which finally reaches 1–0.3 mm. During the entire reaction, good agitation is provided, and a stream of oxygen-free nitrogen is conducted through the mixture.

The colorless polyester thus obtained has a relative viscosity, in a 0.5 percent solution in equal parts of phenol and tetrachloroethane, of 1.34 and melts at 190–200° C. It can be fabricated from the melt into fibers, foils and films.

*Example 4*

30 parts by weight dimethyl ester of 4,4'-carboxy-2,2'-dimethyl-diphenyl carbonate and 115.5 parts by weight dimethyl terephthalate are subjected to an ester interchange with 75 parts by volume ethylene glycol in the presence of 0.1 part by weight sodium aluminum butylate, as described in Example 2. Then, 0.05 part by weight triphenyl phosphate are added, and poly-condensation carried out. An entirely colorless, porcelain-like polyester resin is obtained having a softening point of 220–225° C. and a relative viscosity of 1.34, measured as a 0.5 percent solution in equal parts phenol and tetrachloroethane. Fibers produced from this copolyester by a suitable spinning process have good dyeability and good physical strength properties.

*Example 5*

37 parts by weight methyl ester of 4,4'-carboxy-bis-phenyl carbonate and 93 parts by weight p,p'-sulfonyl dibenzoic acid ethyl ester are subjected to an ester interchange with 60 parts by volume 1,3-propylene glycol in the presence of 0.02 part by weight titanium butylate, and then are heated to 220–240° C. in a condensation vessel provided with agitator, gas inlet and evacuation means, until the principal amount of propylene glycol has distilled. The temperature is changed to 280–290° C. During the reaction, a stream of oxygen-free nitrogen is conducted through the mixture and strong agitation applied in order to facilitate evaporation of the glycol. After 2 to 3 hours, the polyester formed has the viscosity required for further fabrication. The colorless resin obtained has a relative viscosity of 1.35, measured as a 0.5 percent solution in equal parts phenol and tetrachloroethane, and melts at 235–245° C. The polymer can be fabricated into fibers, films and other shaped structures.

*Example 6*

41.2 parts by weight methyl ester of 4,4'-carboxy-bis-phenyl carbonate, 18.2 parts by volume dimethyl succinate and 231 parts by weight dimethyl terephthalate are subjected to ester interchange with 150 parts by volume ethylene glycol. The catalyst used thereby is 0.4 part by weight of the calcium salt of p-oxybenzoic acid. After the theoretically calculated amount methanol has distilled, 0.1 part by weight lead acetate and 2.5 parts by weight p-toluylic acid anhydride are added to the reaction mixture, and polycondensation of the latter is carried out in a condensation vessel, as described in Example 2.

The colorless polyester obtained melts at 210–215° C. and has a relative viscosity of 1.37, as determined in a 0.5 percent solution in equal parts phenol and tetrachloroethane. The polymer can be fabricated into fibers, foils and other shaped structures from the melt or out of solution.

We claim as our invention:

1. A process for the production of copolyesters, which comprises polycondensing carbonates of ω-oxyalkyl esters of aromatic oxycarboxylic acid having the generic formula:

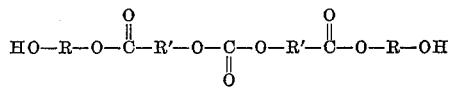

wherein R are alkylene radicals having 2 to 8 carbon atoms and R' are arylene radicals, together with bis-ω-oxyalkyl esters of dicarboxylic acids having the generic formula:

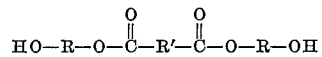

wherein R is an alkylene radical having 2 to 8 carbon atoms and R' is selected from the group consisting of an arylene radical and an alkylene radical having 2–10 carbon atoms, in the presence of catalysts, selected from the group consisting of ester interchange-promoting catalysts and polyesterification-promoting catalysts, in amounts ranging from 0.003 to 0.3 percent by weight, calculated on the substances employed, at temperatures ranging substantially from 240–300° C., at an initial pressure of 15 mm. Hg., and at a further reduced pressure of 3–0.05 mm. Hg, until the desired viscosity has been attained, whereby the proportions of the reactants are up to 75 mol percent dicarboxylic acid, up to 8.3 mol percent carbonic acid and up to 16.7 mol percent oxycarboxylic acid.

2. The process according to claim 1, wherein the bis-θ-oxyalkyl ester of 4,4'-carboxy-bis-phenyl carbonate and the bis-β-oxyalkyl ester of the dicarboxylic acids are produced by an ester interchange with a glycol.

3. The process according to claim 1, wherein the carbonate of the bis-ω-oxyalkyl ester of an aromatic oxycarboxylic acid is the bis-β-oxyethyl ester of 4,4'-carboxy-2,2'-dimethoxy-bis-phenyl carbonate.

4. The process according to claim 1, wherein the bis-β-oxyethyl ester of terephthalic acid is used.

No references cited.